Patented Nov. 21, 1933

1,936,456

UNITED STATES PATENT OFFICE 1,936,456

THERAPEUTIC PREPARATION

Winford P. Larson, Minneapolis, Minn., and Mortimer Bye, Cincinnati, Ohio, assignors to The Wm. S. Merrell Company, Cincinnati, Ohio, a corporation of Ohio No Drawing. Application May 1, 1929
Serial No. 359,712

3 Claims. (Cl. 167—68)

The disclosure herein deals with supplemental and additional discoveries related to the disclosures in the patents to one of the co-inventors herein, and bearing Numbers 1,621,118; 1,621,119; 1,621,117; and 1,663,336, which cover the treatment of bacteria and their products with a salt of unsaturated fatty acids, especially ricinoleic acid. Reference is made to copending application Serial No. 513,355, filed February 4, 1931, wherein this invention is broadly described and claimed.

Our further investigation of the action of salts of unsaturated fatty acids on various diseases of the gastro-intestinal tract in animals and man disclosed that certain gastro-intestinal disorders, especially disorders of the colon, are alleviated or cured by the administration of such salts as for instance sodium ricinoleate. This is probably due to the fact that ricinoleate fraction of the salt acts upon the toxins which result from abnormal putrefaction, fermentation and infection of the digestive tract, neutralizing the resultant toxins and thus preventing their absorption in toxic form.

We have further discovered that salts of certain unsaturated fatty acids, such as the sodium salt of ricinoleic acid, may be associated with or combined with preparations or substances to provide preparations which may be administered and applied in various manners for treating various conditions requiring therapeutic attention. To this end it may be made into a fluid liquid, a lotion, an ointment or paste, or a powder, the specific vehicle in each being naturally adapted to the particular mode of use as hereinafter exemplified.

We have discovered that salt of an unsaturated fatty acid, for example, sodium ricinoleate, carried by fluid vehicles, facilitates treatment of various internal and external body surfaces exhibiting abnormal conditions and that a fluid vehicle will carry the sodium ricinoleate into the internal and cutaneous crevices, into pores, and interstices. Our invention facilitates treatment of conditions that may or must be reached through body orifices. We have found that for such internal conditions, especially those wherein there is infection of the lower intestine or where there is abnormal discharge from mucous membranes, such fluid, liquid or lotion is particularly efficacious.

Good results are attained from a preparation comprising 64 parts water, 30 parts alcohol, .01 part menthol, 5 parts sodium ricinoleate, .05 part eucalyptol, .01 part thymol, .2 part sodium salicylate, .2 part sodium benzoate, and .02 part methyl salicylate, for oral use as a mouth wash or dental product.

In some instances good results may be obtained from a carrier comprising approximately two-thirds water and one-third alcohol, into which sodium ricinoleate in varying amounts may be introduced. Ordinarily sodium ricinoleate in the proportion of about 1 part to 20 parts of the vehicle will give good results. It has also been found that sodium ricinoleate admixed with mineral or vegetable oils and encased in gelatin capsules offer an ideal way to administer sodium ricinoleate internally as the gelatin capsule enables the material to pass through the stomach into the lower intestine, where the sodium ricinoleate is liberated and where its effects are made available, acting on the intestinal mucosa and the intestinal flora.

Preparations made in conformity with the disclosures herein, are particularly valuable for internal administration for the reason that the preparation has germicidal and detoxifying action, however, the antigenic properties of the infectious or infective organisms are not destroyed.

Fluid preparations of the character disclosed herein possess the properties mentioned, and which properties are efficacious, regardless of whether the product is applied locally, externally or internally, or by hypodermic injections.

We have also discovered that salts of certain unsaturated fatty acids, such as the sodium salt of ricinoleic acid, for instance sodium ricinoleate may be associated with colloidal, paste or ointment-like substances, whereby the sodium ricinoleate may be retained in substantial volume on, about and around various infected body areas, internal and external, whereby to provide a continuous available supply of effective sodium ricinoleate at or around such infection. In some extremely virulent cases of infection, the most effective treatment is attained only by a constant adequate supply of a germicidal and detoxifying agent at the place of infection. Generally the excretions of a mucous character tend to separate the therapeutic agent from the surface requiring treatment, with the result that many times, failure to reapply additional therapeutic preparations, or to remove the mucous discharge to permit direct action of the preparation on the affected parts, delays recovery or healing. Sodium ricinoleate apparently has the property of permeating such mucous discharges, and if it can be retained in contact with the indicated discharges, by means of a vehicle that will release the sodium ricinoleate to the mucous or other discharges, the sodium ricinoleate finds its way into practically continuous direct contact with the infected area, whereby the germicidal and detoxifying properties of the sodium ricinoleate are almost continuously functioning for correcting the abnormal condition. In addition, this action of the sodium ricinoleate, does not destroy the antigenic properties of the detoxified organisms that generally abound in the mucous and other excretions, and on the surface and in the interstices of the infected parts.

Good results may be obtained from a preparation comprising 15 parts petrolatum, 15 parts lanoline, 5 parts sodium ricinoleate, 3 parts beeswax, 1 part phenolated camphor and 1 part phenol.

In some instances a composition of about 1 part sodium ricinoleate and 15 parts petrolatum will give good results. Our claims are not restricted to the use of such a base of vehicle as described above, as any vehicle suitable for carrying the sodium ricinoleate may be employed.

A further objective of this invention is to provide a preparation comprising such a salt of such an unsaturated fatty acid that may be used for treatment of such afflictions as are most readily and conveniently treated and with least pain and annoyance to the patient, when the preparation is in powder form.

We have found that a suitable base may be provided of 80 parts talc (purified), 10 parts starch and 7 parts zinc stearate. To this base is added two parts sodium ricinoleate and one part phenol. A suitable quantity of any one of various desirable aromatics may be added.

Although any one of the indicated base materials might be used to the exclusion of the other base materials, we have found that the approximate stated proportions of the indicated pulverized substances, provides an excellent carrier, having no deteriorating effect on the sodium ricinoleate, and apparently entering into such relationship with each other and the other ingredients, that the efficiency of the sodium ricinoleate is not impaired, but instead, its therapeutic effects are apparently enhanced. There is no evidence of sogginess developing in the preparation as one would ordinarily expect from a granular or pulverized substance when inoculated with or associated with a heavy vegetable oil, fat or substance such as sodium ricinoleate. The resultant product is readily dusted over infected parts of the body, obviating physical contacts such as are necessary in applying ointments, and also there is obviated the softening of tissues and mucous as would result from fluid preparations.

The preparation has germicidal and detoxifying action; it detoxifies pathogenic and other organisms, without destroying the antigenic properties of the organism.

The preparation in powder form disclosed herein is one that is especially suitable for the treatment of dandruff and other irritations and infections of the head and scalp, and for infections and irritations, wounds, burns and lacerations of the body parts. We do not restrict our claims to the base as given above, as other suitable powder bases may be employed as a carrier or vehicle for the above described salts of unsaturated fatty acids, such as sodium ricinoleate.

By the statement, into the mucosa, tissues and blood stream of the animal body is intended not only intravenous injection, but also the application of sodium ricinoleate, to such subcutaneous mucosa, and tissues as may be exposed as the result of wounds, operations, infections and the like.

In summary it is to be particularly noted that the compound of the invention comprising the unsaturated salts of fatty acids, especially sodium ricinoleic acid in any and all forms suggested herein acts as a detoxicant without impairment of antigenic action.

What is claimed is:

1. A detoxicant, therapeutic compound for internal use comprising sodium ricinoleate.

2. A detoxicant, therapeutic compound for intravenous administration comprising sodium ricinoleate.

3. A detoxicant, therapeutic compound comprising sodium ricinoleate, for introduction into the mucosa, tissues, and blood stream of the animal body, which compound combats the toxic condition in the body and blood stream when infections and toxins are actually present without destroying the antigenic properties of pathogenic organisms.

WINFORD P. LARSON.
MORTIMER BYE.